United States Patent Office 3,476,808
Patented Nov. 4, 1969

3,476,808
CATALYTIC OXIDATIVE DEHYDROGENATION OF KETONES
Robert W. Etherington, Jr., Pennington; and Koei-Liang Liauw, Clark, N.J., assignors to Mobil Oil Corporation, a corporation of New York
No Drawing. Continuation-in-part of application Ser. No. 639,029, May 17, 1967. This application Mar. 11, 1968, Ser. No. 711,864
Int. Cl. C07c 47/20
U.S. Cl. 260—586                   8 Claims

ABSTRACT OF THE DISCLOSURE

Ketones having at least one pair of hydrogen atoms on the alpha and beta carbon atoms are oxidatively dehydrogenated to the corresponding ethylenically unsaturated ketone by contacting the ketone and molecular oxygen-containing gas with a catalyst containing a metal of Group I–B (Cu, Ag, Au) in the vapor phase (400–750° C.). The catalyst can be a Group I–B metal, alloy, or oxysalt and may be on a support. Gold is especially preferred. The unsaturated ketone products can be polymerized and copolymerized to thermoplastic polymers useful for making extruded or molded shapes.

CROSS-REFERENCES TO RELATED APPLICATIONS

This application is a continuation-in-part of copending application Ser. No. 639,029, filed May 17, 1967, now abandoned.

BACKGROUND OF THE INVENTION

Field of the invention

This invention relates to oxidative dehydrogenation. It is more particularly concerned with selective catalytic oxidative dehydrogenation of ketones to unsaturated ketones.

Description of the prior art

Various methods have been proposed to prepare unsaturated ketones, such as 2-cyclohexen-1-one. Many give low yield of product. Others involve reactants that are either relatively expensive or not readily available or both.

For example, it has been proposed to oxidize cyclohexene to 2-cyclohexen-1-one (U.S. Patent Nos. 2,992,272 and 2,369,182). Another procedure involves dehydrobromination of 2-bromo-cyclohexanone [J. Chem. Soc. 607 (1954)]. The procedure set forth in Organic Syntheses uses 3-ethoxy-2-cyclohexanone as the starting material [org. syn., 40, 14 (1960)]. A recent patent (U.S. 3,050,561) described a route using vinylcyclohexene. A Birch reduction of anisole gives 2-cyclohexen-1-one in about 20% yield in small scale reactions [J. Chem. Soc., 430 (1934)]. Larger scale reactions, however, are very hazardous. Insofar as is now known, it has not been proposed to prepare 2-cyclohexene-1-one or other unsaturated ketones by selective dehydrogenation of the corresponding saturated ketone.

SUMMARY OF THE INVENTION

It is the discovery of this invention that unsaturated ketones can be prepared by selective dehydrogenation. This invention provides a method for producing an unsaturated ketone that comprises contacting a ketone reactant and a molecular oxygen-containing gas, in the vapor phase, with a catalyst comprising a metal, oxide or oxysalt of Group I–B metals.

DESCRIPTION OF SPECIFIC EMBODIMENTS

The ketone reactant used in the process of this invention is a ketone having at least one pair of alpha and beta carbon atoms with at least one hydrogen atom on each. It can be an open chain ketone or a cyclic ketone. Typical ketone reactants are ethyl phenyl ketone butanone (methylethyl ketone); pentanone-2; pentanone-3; hexanone-2; 2-methyl-pentanone-3; heptanone-4; 2,4-dimethylpentanone-3; heptanone-3; 2-methylhexanone-5; octanone-3; 4-methylheptanone-5; octanone-2; nonanone-2; nonanone-5; decanone-2; decanone-4; undecanone-2; undecanone-3; tetradecanone-3; cyclopentanone; cyclohexanone; 3-methylcyclohexanone; cycloheptanone; and 2,5-dimethylcyclohexanone.

In the process of this invention, the molar ratio of molecular oxygen to ketone reactant can be between 0.1 and 3, but preferably it is between 0.2 and 2. Pure oxygen can be used, but generally mixtures containing molecular oxygen are used, such as air, mixtures of air and oxygen, and mixtures of oxygen with nitrogen.

The catalyst utilized in the process of this invention comprises a metal of Group I–B of the Periodic Chart of the Elements. The Periodic Chart referred to is that appearing on pages 58–59 of Lange's Handbook of Chemistry, seventh edition (1949). The preferred catalysts are metallic. They can be in the form of wire, gauze, pellets or coating on a support. They can be alloyed with other metals. It is also within the contemplation of this invention to use these metals in the form of oxides and oxysalts, usually but not necessarily on support. The catalyst supports can be any inert refractory material such as alumina, silicon carbide, and alundum. When supported, the amount of catalytic metal, oxide, or oxysalt in the catalyst can vary widely between about 1% and about 50% or more, by weight. Especially preferred catalysts are metallic gold and supported metallic gold.

The oxidative dehydrogenation reaction of this invention is carried out in the vapor phase at temperatures varying between about 400° C. and about 750° C., preferably between about 500° C. and about 700° C. The contact time of cyclohexanone with the catalyst can be between about 0.001 sec. and about 20 sec. In the preferred continuous operation cyclohexanone is charged at a LHSV (volume liquid charge per volume catalyst per hour) of 0.1 to 20.

Any vessel suitable for carrying out exothermic vapor phase reactions is utilizable herein. The process can be carried out batch wise but it is more suitably carried out in a continuous process. In such operation, unreacted ketone reactant can be recycled to extinction, after separation from the product and the small amount of phenol by-product, in the case of cyclohexanone. It should be noted that the phenol by-product has many well known uses, e.g., in manufacture of phenolic resins.

EXAMPLE 1

A copper catalyst was prepared by mixing a solution of 50.7 g. of cupric chloride in 100 g. of distilled water with 270 g. of ⅛" x ⅛" silicon carbide pellets and evaporating the mixture to dryness.

A 75 ml. portion of the dry catalyst was placed in a 24 mm. I.D. x 14" long vertically-mounted high-silica glass (Vycor) tube reactor containing a concentric 7 mm. Vycor thermocouple well. The portion of the reactor above the catalyst bed was packed with inert pellets to act as a mixing and preheating section. The reactor was enclosed in an electric tube furnace.

The catalyst bed was slowly heated to 500° C. in a stream of air and was maintained at this temperature overnight. A mixture of air and cyclohexanone vapor was then passed over the catalyst for several hours to condition the catalyst. A mixture of air and cyclohexanone vapor was then introduced to the reactor at the rates of 0.0062 moles of $O_2$/min. and 0.0046 moles of cyclohexanone/min. The maximum bed temperature was in the range of 618–630° C. The condensed organic products, after separation of a small aqueous layer, contained 84% unreacted cyclohexanone, 13.3% 2-cyclohexen-1-one, and approximately 3% phenol.

EXAMPLE 2

A 75 ml. bed of silver catalyst (4% silver on 1/8" x 1/8" alundum pellets) was placed in a vertically-mounted 3/4" I.D. stainless steel pipe reactor containing a concentric 1/4" stainless steel thermocouple well. A mixing and preheating bed of inert alumina pellets was placed on top of the catalyst bed. The reactor was heated with an electric tube furnace.

Cyclohexanone was pumped at the rate of 0.62 ml./min. Through a heated transfer line acting as a vaporizer to the top of the reactor where it was mixed with air (525 std. cc./min.) and nitrogen (1571 std. cc./min.). The maximum bed temperature was 575° C. The gaseous reaction mixture leaving the reactor was passed through a series of condensers. The condensed organic product was analyzed by gas chromatography and was found to contain 76% cyclohexanone, 18% 2-cyclohexen-1-one, and 6% phenol.

EXAMPLE 3

In a reactor similar to that of Example 2, the catalyst bed consisted of a 60 ml. section packed with discs of 20 mesh silver gauze. Cyclohexanone was pumped at the rate of 1.57 ml./min. through the vaporizer, was mixed with 1700 std. cc./min. of air and 2500 std. cc./min. of nitrogen. The maximum catalyst bed temperature was 650° C. The condensate obtained from the reaction mixture after 88.8 g. of cyclohexanone has been fed consisted of 10.4 g. of an aqueous layer and 75.6 g. of organic layer. The organic layer was analyzed by gas chromatography. It was found to contain 4.8 g. of dissolved water, 49.7 g. of cyclohexanone, 18.5 g. 2-cyclohexen-1-one, and 2.6 g. of phenol.

EXAMPLE 4

A gold catalyst was prepared by evaporation of a gold trichloride solution (aqueous) in the presence of 1/8" x 1/8" pellets of inert alumina of <1 m.$^2$/g. surface area. The catalyst contained approximately 4% gold, calculated as the metal. A 54 ml. portion of the dried catalyst was placed in a 5/8" O.D. 14 1/2" copper tube reactor in an electric furnace. The catalyst was heated at 400° C. overnight in a stream of air. A mixture of cyclohexanone vapor (0.0033 g. mole/min.) and air (0.0107 g. mole $O_2$/min.) was passed through the catalyst bed. The maximum bed temperature as measured on the outside wall of the reactor was 560° C. The condensed organic product contained 64.1% unreacted cyclohexanone, 30.8% 2-cyclohexen-1-one, 5.1% other products, mostly phenol.

EXAMPLE 5

In a reactor similar to that of Example 2, the catalyst bed consisted of a 32 ml. section packed with 1/4" lengths of 30 gauge gold wire. Cyclohexanone was pumped at the rate of 1.45 ml./min. through the vaporizer, was mixed with 1800 std. cc./min. of air and 2500 std. cc./min. of nitrogen. The maximum catalyst bed temperature was 600° C. The condensate obtained from the reaction mixture after 130.4 g. of cyclohexanone had been fed consisted of 102 g. of cyclohexanone, 25.7 g. of 2-cyclohexen-1-one, 1.5 g. of phenol and 1.5 g. of water, by gas chromatographic analysis.

EXAMPLE 6

In a titanium pipe reactor similar in design to the stainless steel pipe reactor of Example 2, the catalyst bed was a 32 ml. section packed with a catalyst consisting of 10% gold on a 3/16" spherical ceramic support. Cyclohexanone was pumped at the rate of 2.34 ml./min. through the vaporizer, was mixed with 450 std. ml./min. of air and 2500 std. ml./min. of nitrogen. The maximum catalyst bed temperature was 600° C. The condensate obtained from the reaction of 203.2 g. of cyclohexanone consisted of 159 g. cyclohexanone, 33.2 g. of 2-cyclohexen-1-one, 1.8 g. of phenol, and 3.9 g. of water.

The 2-cyclohexen-1-one produced in accordance with this invention is a precursor for manufacture of 4-benzothienyl N-methylcarbamate, a highly effective pesticide. The 2-cyclohexen-1-one can be converted to 3-mercaptocyclohexanone, e.g., by reacting a benzene solution of the cyclohexanone with hydrogen sulfide at room temperature. 3-mercaptocyclohexanone is then reacted with 2,2-dichloroacetaldehyde at 90–100° C. in the presence of a protic acid catlyst (HCl) to form 4-oxo-4, 5,6,7-tetrahydrobenzothiophene (see U.S. Patent No. 3,346,591). The 4-oxo-4,5,6,7-tetrahydrobenzothiophene can then be dehydrogenated to 4-hydroxybenzothiophene by several methods such as that of Fieser et al., J. Am. Chem. Soc. 57, 1611 (1935). The 4-hydroxybenzothiophene can then be converted to 4-benzothienyl N-methylcarbamate by methods fully detailed in U.S. Patent Nos. 3,288,673 and 3,288,808. These patents also demonstrate the pesticidal effectiveness of this material.

As indicated hereinbefore, the process of this invention is applicable to other acyclic and cyclic ketones. The following examples illustrate the use of some other ketones with the preferred metallic gold.

EXAMPLE 7

A reactor described in Example 2 was filled with 70 cc. of 1/8" x 1/8" alundum followed by 60 cc. of catalyst consisting of 10% gold deposited on 3/16" spheres of inert alumina. The rector was heated with an electric tube furnace.

Cyclopentanone was pumped at the rate of 1.1 ml./min. through a heated transfer line functioning as a vaporizor to the top of the reactor where it was mixed with both air being pumped at the rate of 800 std. cc./min. and nitrogen at 800 std. cc./min. The mixture of the gases then passed through the heated catalyst bed. The moximum temperature of the catalyst bed was 566° C. The product contained 20.2% 2-cyclopenten-1-one, and 79.3% unreacted cyclopentanone.

EXAMPLE 8

With the same reactor as in Example 7, 3-methylcyclohexanone, fed at 1 ml./min., air fed at 700 std. cc./min., and nitrogen fed at 700 std. cc./min. were preheated, mixed, and then passed through the reactor. The maximum temperature of the catalyst bed was 572° C. The organic product contained 12.4% 5-methyl-2-cyclohexen-1-one, 9.2% 3-methyl-2-cyclohexen-1-one, and 78.4% unreacted 3-methylcyclohexanone.

EXAMPLE 9

With the same reactor as in Example 7, heptan-4-one, fed at 1 ml./min., air fed at 800 std. cc./min. and nitrogen fed at 800 std. cc./min. were preheated, mixed, and then passed through the reactor. The maximum temperature of the catalyst bed was 552° C. The product contained 9.9% 2-hepten-4-one, 1.9% 2,5-heptadien-4-one, and 86% unreacted heptan-4-one.

EXAMPLE 10

A reactor similar to that of Example 2 was filled with 110 cc. of catalyst consisting of 10% gold deposited on 3/16" spheres of inert alumina. Ethyl phenyl ketone, fed at 0.6 ml./min. air fed at 800 std. cc./min., and nitrogen fed at 800 std. cc./min. were preheated, mixed and then passed through the reactor. The maximum temperature of the catalyst bed was 620° C. The product contained 45.4% phenyl vinyl ketone and 52.4% unreacted ethyl phenyl ketone.

EXAMPLE 11

A reactor similar to that of Example 2, except 18″ in length, was filled with 32 cc. of 30 gauge gold wire cut into ¼″ in length.

Methyl ethyl ketone, fed at 1.8 ml./min., air fed at 1800 std. cc./min. and nitrogen fed at 2500 std. cc./min. were preheated, mixed, and then passed through the reactor. The maximum temperature of the catalyst bed was 600° C. The product contained 7.8% methyl vinyl ketone, 1.3% 2,3-butanedione, and 90.8% unreacted methyl ethyl ketone.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A method for producing an unsaturated ketone that comprises contacting a ketone reactant selected from the group consisting of ethyl phenyl ketone, butanone, pentanone-2, pentanone-3, hexanone - 2,2 - methylpentanone-3, heptanone-4, 2,4-dimethylpentanone-3, heptanone-3, 2-methylhexanone-5, octanone-3, 4-methylheptanone-5, octanone-2, nonanone-2, nonanone-5, decanone-2, decanone-4, undecanone-2, undecanone-3, tetradecanone-3, cyclopentanone, cyclohexanone, 3-methylcyclohexanone, cycloheptanone, and 2,5-dimethylcyclohexanone and a molecular oxygen-containing gas, in the vapor phase, with a catalyst consisting essentially of metallic gold or supported metallic gold, at a temperature of between about 500° C. and about 700° C.

2. The method defined in claim 1, wherein said catalyst is gold on an inert support.

3. The method defined in claim 1, wherein said reactant is cyclohexanone.

4. The method defined in claim 2, wherein said reactant is cyclohexanone.

5. The method defined in claim 2, wherein said reactant is cyclopentanone.

6. The method defined in claim 2, wherein said reactant is methylcyclohexanone.

7. The method defined in claim 2, wherein said reactant is heptan-4-one.

8. The method defined in claim 2, wherein said reactant is ethyl phenyl ketone.

References Cited
UNITED STATES PATENTS

| | | | |
|---|---|---|---|
| 2,101,820 | 12/1937 | Woodhouse | 260—601 |
| 3,156,735 | 11/1964 | Armstrong | 260—596 |
| 3,329,724 | 7/1967 | Hargis et al. | 260—593 |
| 3,364,264 | 1/1968 | Hardman et al. | 260—586 |

LEON ZITVER, Primary Examiner

M. M. JACOB, Assistant Examiner

U.S. Cl. X.R.

260—592, 593